US010598985B1

(12) United States Patent
Chen et al.

(10) Patent No.: US 10,598,985 B1
(45) Date of Patent: Mar. 24, 2020

(54) FRONT-LIT DISPLAY

(71) Applicant: Himax Display, Inc., Tainan (TW)

(72) Inventors: Kuan-Yu Chen, Tainan (TW);
Yuet-Wing Li, Tainan (TW);
Kuan-Hsu Fan-Chiang, Tainan (TW);
Hsien-Chang Tsai, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/359,952

(22) Filed: Mar. 20, 2019

(51) Int. Cl.
*F21V 9/14* (2006.01)
*G02F 1/13357* (2006.01)
*F21V 8/00* (2006.01)
*G02F 1/1362* (2006.01)
*G02F 1/1335* (2006.01)

(52) U.S. Cl.
CPC ......... *G02F 1/1336* (2013.01); *G02B 6/003* (2013.01); *G02B 6/0056* (2013.01); *G02B 6/0068* (2013.01); *G02B 6/0073* (2013.01); *G02F 1/136277* (2013.01); *G02F 2001/133616* (2013.01); *G02F 2203/02* (2013.01)

(58) Field of Classification Search
None
See application file for complete search history.

(56) References Cited

U.S. PATENT DOCUMENTS 10,429,687 B2 * 10/2019 Lee ................. G02F 1/133528
2010/0302798 A1 * 12/2010 Papakonstantinou .......................
G02B 6/0036
362/601
2016/0131898 A1 * 5/2016 Chen ................. G02B 27/0172
349/11

FOREIGN PATENT DOCUMENTS

WO    WO-03089839 A1 * 10/2003 ........... G02B 6/0068

* cited by examiner

*Primary Examiner* — Vip Patel
(74) *Attorney, Agent, or Firm* — JCIPRNET (57) ABSTRACT

A front-lit display includes a light source, a coupling lens, a first and a second polarizers, a light guide plate, and a reflective display panel. The light guide plate has a first surface, a second surface, a side surface connecting the first and second surfaces, and light guiding microstructures located between the first and second surfaces. The first polarizer, the coupling lens, and the light source are sequentially disposed at a side of the side surface. Light emitting elements of the light source that emit light beams of different colors are arranged along a first direction instead of a second direction. The first direction is parallel to the side surface and the first surface, and the second direction is parallel to the side surface and perpendicular to the first surface. The coupling lens includes vertical columnar structures arranged along the first direction and respectively extending along the second direction.

12 Claims, 7 Drawing Sheets

FRONT-LIT DISPLAY

BACKGROUND OF THE INVENTION

Field of the Invention

The invention relates to a display and more particularly relates to a front-lit display.

Description of Related Art

In a display equipped with a backlight module, a light uniformity of the backlight module is improved by providing a diffuser and placing light emitting elements of the same color in a horizontal manner or placing light emitting elements of different colors in a delta arrangement. However, for a front-lit display, controllable ray path is needed to maintain polarization and small etendue. In the front-lit display, the above arrangement of the light emitting elements not only enlarges the etendue in the horizontal direction and makes the ray path control design more difficult, but also causes the non-uniform color problem. Besides, the diffuser not only scatters the light beams from the light source, disrupts the polarization direction, resulting in reduction of light efficiency and contrast ratio, but also enlarges the etendue in the horizontal direction and makes the ray path control design more difficult.

SUMMARY OF THE INVENTION

The invention provides a front-lit display, which has good light uniformity, light efficiency, and contrast ratio.

An embodiment of the invention provides a front-lit display including a light source, a coupling lens, a first polarizer, a light guide plate, a second polarizer, and a reflective display panel. The light source is adapted to output light beams of different colors. The coupling lens is disposed on transmission paths of the light beams from the light source. The first polarizer is disposed on transmission paths of the light beams from the coupling lens. The light guide plate is disposed on transmission paths of the light beams from the first polarizer. The light guide plate has a first surface, a second surface opposite to the first surface, a side surface connecting the first surface and the second surface, and a plurality of light guiding microstructures located between the first surface and the second surface, wherein the light beams from the first polarizer enter the light guide plate through the side surface. The second polarizer is disposed on the first surface of the light guide plate. The reflective display panel is disposed below the second surface of the light guide plate. The light source includes a plurality of light emitting elements, and the light emitting elements that emit light beams of different colors are arranged along a first direction instead of a second direction. The first direction is parallel to the side surface and the first surface, and the second direction is parallel to the side surface and perpendicular to the first surface. The coupling lens includes a plurality of vertical columnar structures arranged along the first direction and respectively extending along the second direction.

In view of the above, in the front-lit display according to the embodiment of the invention, since the light emitting elements that emit light beams of different colors are arranged along the first direction (the vertical direction) instead of the second direction (the horizontal direction), smaller etendue in the horizontal direction is obtained and the ray path control design is less difficult. Besides, the light uniformity in the horizontal direction is improved by placing the vertical columnar structures instead of a diffuser in front of the light emitting elements, thus the light uniformity is improved without increasing the etendue in the horizontal direction and the difficulty of ray path control design and without decreasing the light efficiency and contrast ratio. Therefore, the front-lit display according to the embodiment of the invention has good light uniformity, light efficiency, and contrast ratio.

In order to make the aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
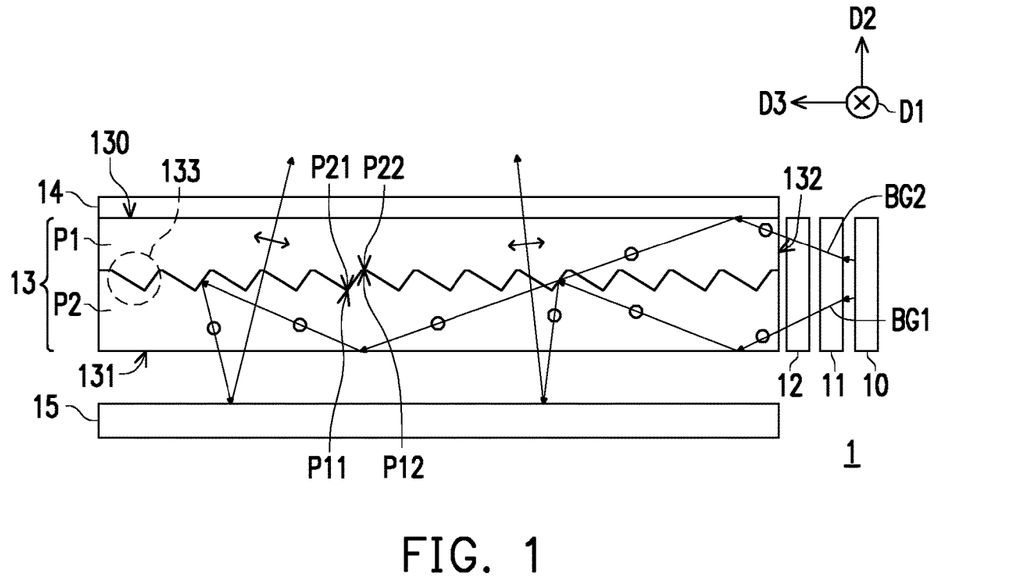
FIG. 1 is a schematic cross-sectional view of a front-lit display according to an embodiment of the invention.

FIG. 1 is a schematic cross-sectional view of a front-lit display 1 according to an embodiment of the invention. Referring to FIG. 1, the front-lit display 1 includes a light source 10, a coupling lens 11, a first polarizer 12, a light guide plate 13, a second polarizer 14, and a reflective display panel 15.

The light source 10 is adapted to output light beams of different colors, e.g. red light beams, green light beams (green light beams BG1 and BG2 are exemplarily shown in FIG. 1), and blue light beams, but the color of the light beams output by the light source 10 is not limited thereto. The coupling lens 11 is disposed on transmission paths of the light beams from the light source 10. The first polarizer 12 is disposed on transmission paths of the light beams from the coupling lens 11. The light guide plate 13 is disposed on transmission paths of the light beams from the first polarizer 12. The light guide plate 13 has a first surface 130, a second surface 131 opposite to the first surface 130, a side surface 132 connecting the first surface 130 and the second surface 131, and a plurality of light guiding microstructures 133 located between the first surface 130 and the second surface 131, wherein the light beams from the first polarizer 12 enter the light guide plate 13 through the side surface 132. The second polarizer 14 is disposed on the first surface 130 of the light guide plate 13. The reflective display panel 15 is disposed below the second surface 131 of the light guide plate 13.

Figure 2A:
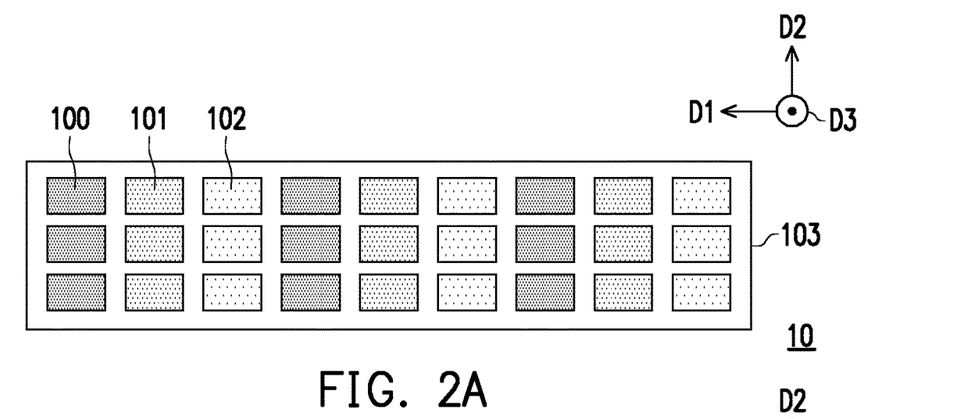
FIGS. 2A and 2B are respectively two schematic front views showing two embodiments of the light source in FIG. 1.
Figure 2B:
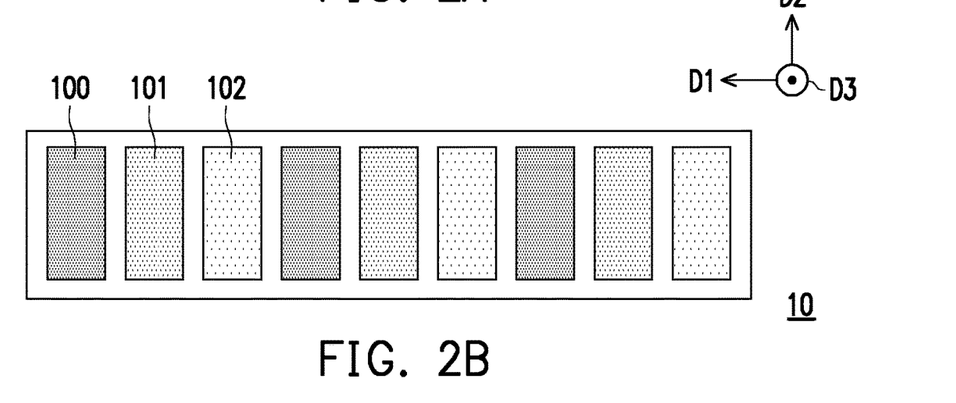

FIGS. 2A and 2B are respectively two schematic front views showing two embodiments of the light source 10 in FIG. 1. Referring to FIGS. 1 to 2B, the light source 10 includes a plurality of light emitting elements, e.g. a plurality of light emitting elements 100 capable of outputting red light beams, a plurality of light emitting elements 101 capable of outputting green light beams, and a plurality of light emitting elements 102 capable of outputting blue light beams. In other words, the light emitting elements 100, the light emitting elements 101, and the light emitting elements 102 are respectively red light emitting elements, green light emitting elements, and blue light emitting elements. However, in other embodiments, the light source 10 may include a plurality of light emitting elements capable of outputting light beams of other colors.

The light emitting elements (e.g. the light emitting elements 100, 101, 102) may be micro LEDs or LEDs, but not limited thereto. Compared to the light source utilizing fluorescent powder to generate light beams of different colors, the light source 10 utilizing the light emitting elements (e.g. micro LEDs or LEDs) to generate light beams of different colors has better color gamut. Besides, the light source 10 may use micro LEDs as the light emitting elements to shorten the light-mixing distance (the distance required to mix different colors of light into white light) of the light emitting elements. On the other hand, the light source 10 may use LEDs as the light emitting elements to reduce the number of light emitting elements required for the light source 10 and to simplify the circuit design.

The light emitting elements (e.g. the light emitting elements 100, 101, 102) that emit light beams of different colors are arranged along a first direction D1 instead of a second direction D2. The first direction D1 is parallel to the side surface 132 and the first surface 130; herein, the first direction D1 may be referred to as a horizontal direction. On the other hand, the second direction D2 is parallel to the side surface 132 but perpendicular to the first surface 130; herein, the second direction D2 may be referred to as a vertical direction. In other words, the light emitting elements that emit light beams of different colors are not arranged along the second direction D2 (the vertical direction). Since the light emitting elements that emit light beams of different colors are arranged along the first direction D1 (the horizontal direction) instead of the second direction D2 (the vertical direction), smaller etendue for the light beams of different colors in the horizontal direction is maintained and the ray path control design is less difficult.

As shown in FIG. 2A, the light emitting elements (e.g. the light emitting elements 100, 101, 102) may be micro LEDs, and the light emitting elements that emit light beams of different colors may be alternately arranged along the first direction D1. Besides, the light emitting elements that emit light beams of the same color may be arranged along the second direction D2, such that the number of the light emitting elements arranged along the second direction D2 is more than one.

As shown in FIG. 2B, the light emitting elements (e.g. the light emitting elements 100, 101, 102) may be LEDs, such as LED chips or LED packages, and the light emitting elements that emit light beams of different colors may be alternately arranged along the first direction D1. Besides, the shape of each light emitting element may be a rectangle, and the long axis of each light emitting element may extend along the second direction D2. As such, the number of the light emitting elements arranged along the second direction D2 may be only one. Alternatively, the number of the light emitting elements arranged along the second direction D2 may be more than one.

The light source 10 may further include other elements according to requirements. For example, the light source 10 may further include a circuit board 103 for carrying the light emitting elements and signal transmission. In other embodiments, a controller (not shown) for controlling on and off states of the light emitting elements may also be disposed on the circuit board 103.

Figure 3:
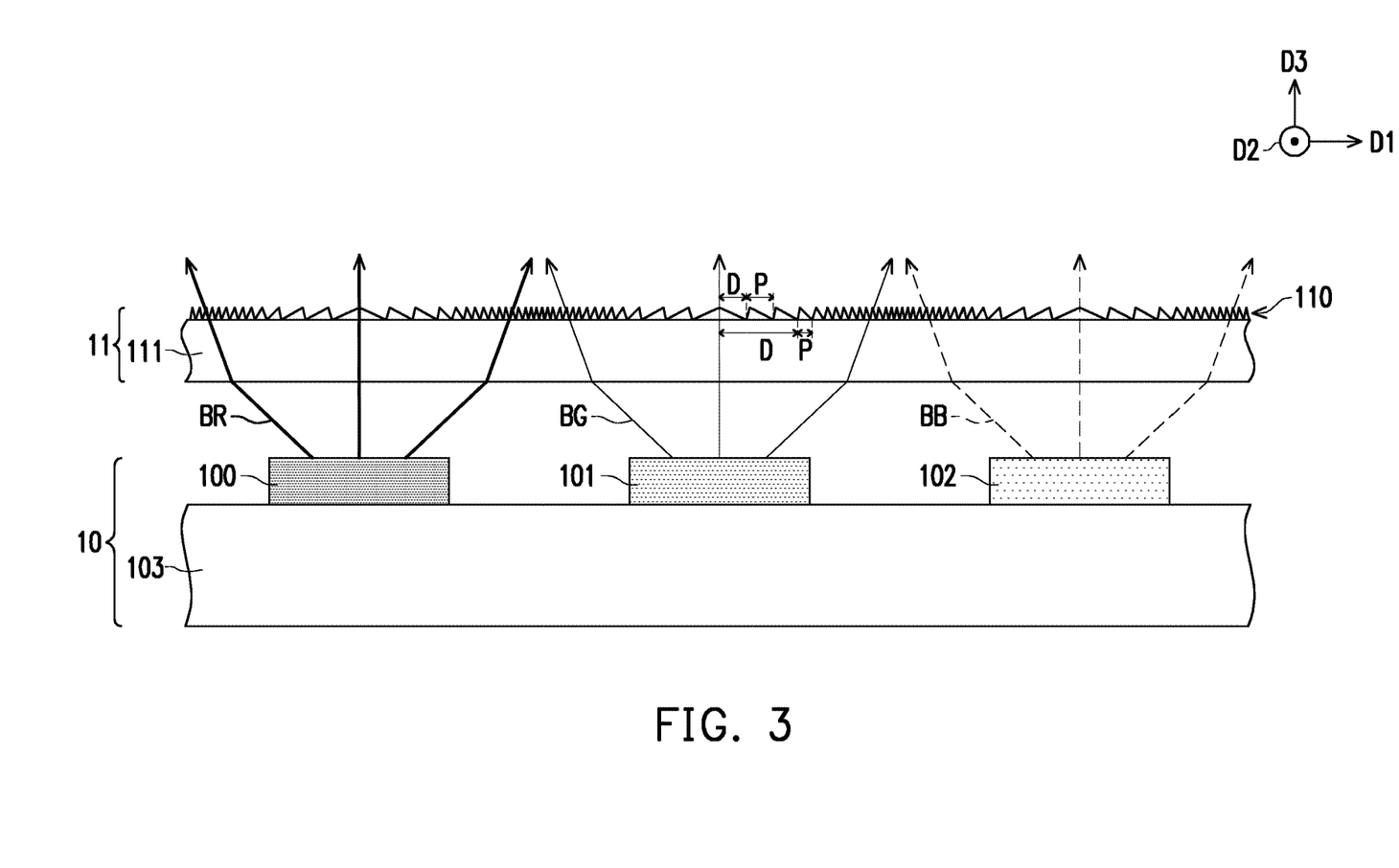
FIG. 3 is a partial schematic cross-sectional view of the light source and the coupling lens in FIG. 1.

The coupling lens 11 is located between the light source 10 and the first polarizer 12. FIG. 3 is a partial schematic cross-sectional view of the light source 10 and the coupling lens 11 in FIG. 1. Referring to FIGS. 1 and 3, the coupling lens 11 includes a plurality of vertical columnar structures 110 arranged along the first direction D1 and respectively extending along the second direction D2.

The vertical columnar structures 110 of the coupling lens 11 are adapted to expand an illumination range of each color light beam (e.g. the red light beam BR, the green light beam BG, and the blue light beam BB) along the first direction D1. For example, the vertical columnar structures 110 may include a plurality of columnar prisms (or referred to as triangular columns). Besides, the columnar prisms may include a plurality of non-isosceles columnar prisms. Specifically, the shapes of the cross sections of at least some of the columnar prisms on the reference plane formed by the first direction D1 and a third direction D3 are not isosceles triangles, wherein the third direction D3 is perpendicular to the first direction D1 and the second direction D2. The vertical columnar structures 110 may be formed on a transparent substrate (e.g. a glass substrate) 111 by curing an optical glue through heat or illumination of light. Moreover, each of the light emitting elements (e.g. the light emitting elements 100, 101, 102) is disposed corresponding to plural (more than one) vertical columnar structures 110 among the plurality of vertical columnar structures 110, and pitches P of the plural vertical columnar structures 110 decrease as distances D to the corresponding light emitting element along the first direction D1 increase. As such, light beams at large angles can be guided toward the light guide plate 13 (referring to FIG. 1) thus expanding the illumination range of each color light beam along the first direction D1.

It is noted that FIG. 3 schematically illustrates an example of the vertical columnar structures 110 and the relative setting relationship between the light emitting elements and the vertical columnar structures 110; however, the number, arrangement, shapes and manufacturing method of the vertical columnar structures 110 and the relative setting relationship between the light emitting elements and the vertical columnar structures 110 are not limited to those shown in FIG. 3 and the description above.

Figure 4:
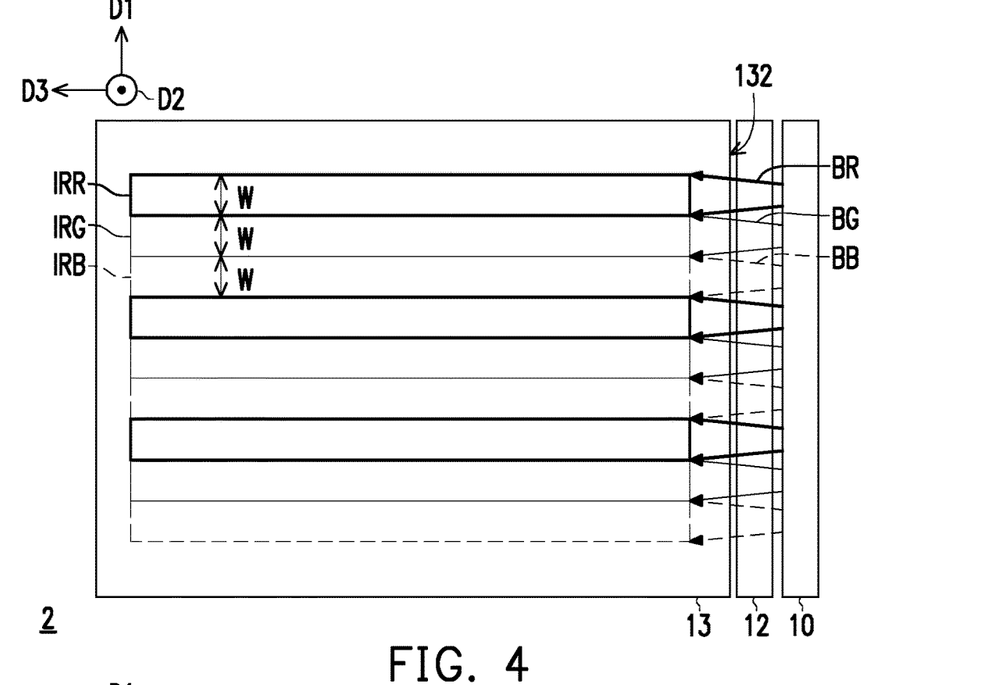
FIGS. 4 and 5 are respectively schematic top views of a comparative front-lit display and the front-lit display according to the embodiment of the invention.
Figure 5:
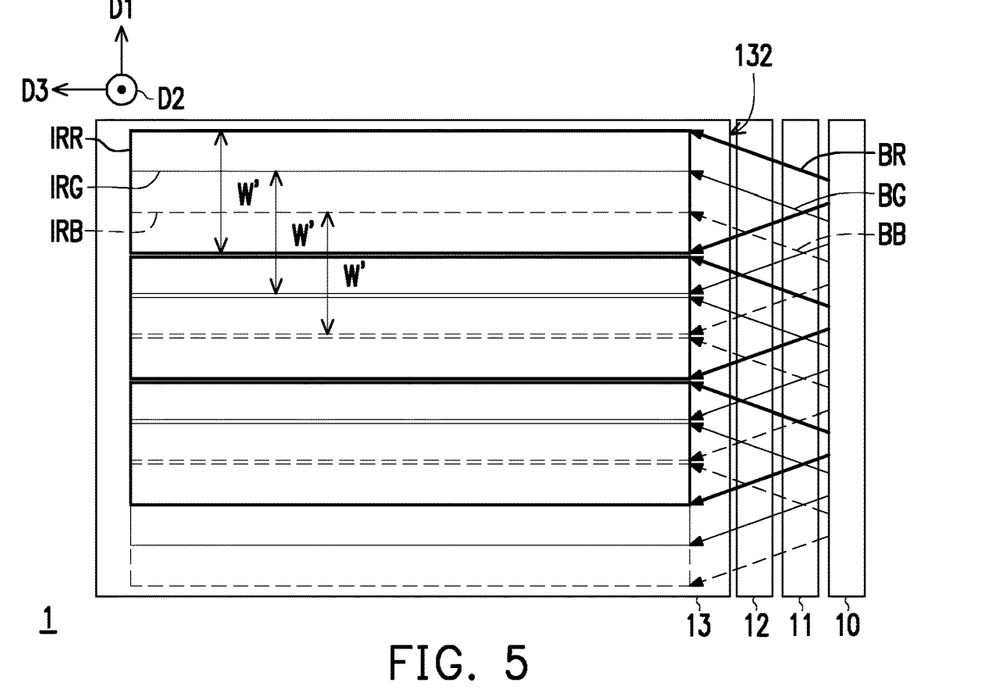

FIGS. 4 and 5 are respectively schematic top views of a comparative front-lit display 2 and the front-lit display 1 according to the embodiment of the invention, wherein the difference between the comparative front-lit display 2 and the front-lit display 1 is that the comparative front-lit display 2 does not include the coupling lens 11 in the front-lit display 1 according to the embodiment.

In FIGS. 4 and 5, to facilitate identification of light beams of different colors, the red light beam BR and its illumination range IRR are indicated by thick solid lines, the green light beam BG and its illumination range IRG are indicated by thin solid lines, and the blue light beam BB and its illumination range IRB are indicated by thin broken lines.

It can be seen from FIG. 4 and FIG. 5 that a width W' of each of the illumination ranges IRR, IRG and IRB along the first direction D1 in the front-lit display 1 according to the embodiment is greater than a width W of each of the illumination ranges IRR, IRG and IRB along the first direction D1 in the comparative front-lit display 2. Since illumination ranges of different color light beams are overlapped along the first direction D1, the light uniformity in the first direction D1 (the horizontal direction) is improved. Besides, since the light uniformity in the horizontal direction is improved by placing the vertical columnar structures 110 instead of a diffuser in front of the light emitting elements, the light uniformity is improved without increasing the etendue in the horizontal direction and thus the ray path control design is less difficult, and the light efficiency and contrast ratio can be maintained. Therefore, the front-lit display 1 may have good light uniformity, light efficiency, and contrast ratio.

Referring back to FIG. 1, the light guide plate 13 is disposed between the second polarizer 14 and the reflective display panel 15, and the side surface 132 of the light guide plate 13 faces the first polarizer 12. The light guiding microstructures 133 within the light guide plate 13 are adapted to direct the light beams to the reflective display panel 15 and allow the light beams from the reflective display panel 15 to pass through. It is noted that FIG. 1 schematically illustrates an example of the light guide plate 13 and the light guiding microstructures 133 thereof; however, the number, arrangement and shapes of the light guide plate 13 and the light guiding microstructures 133 thereof are not limited to those shown in FIG. 1.

As shown in FIG. 1, the light guide plate 13 includes a first portion P1 and a second portion P2, wherein the first portion P1 is located between the second portion P2 and the second polarizer 14. The first portion P1 and the second portion P2 have a plurality of complementary columnar prisms at an interface therebetween, and the plurality of light guiding microstructures 133 includes the plurality of complementary columnar prisms. Specifically, the first portion P1 has a plurality of convex parts P11 and a plurality of concave parts P12 alternately arranged in the third direction D3, and the second portion P2 has a plurality of concave parts P21 and a plurality of convex parts P22 alternately arranged in the third direction D3, wherein the convex parts P11 of the first portion P1 and the concave parts P21 of the second portion P2 are complementary in shape and connected together, and the concave parts P12 of the first portion P1 and the convex parts P22 of the second portion P2 are complementary in shape and connected together. The convex parts P11, the concave parts P12, the concave parts P21 and the convex parts P22 form the complementary columnar prisms. Besides, the first portion P1 and the second portion P2 have the same refractive index to avoid ghost image. In order to achieve the PBS effect (to reflect S-polarized light and allow P-polarized light to pass through), a multi-layer coating may be formed at the interface between the first portion P1 and the second portion P2.

The reflective display panel 15 is disposed on transmission paths of the light beams from the light guide plate 13 to convert the light beams (illumination light beams) from the light guide plate 13 into image light beams. For example, the reflective display panel 15 is a liquid crystal on silicon display, but not limited thereto.

The first polarizer 12 and the second polarizer 14 have opposite polarization directions. For example, the first polarizer 12 is adapted to allow the s-polarized light beams to pass through and filter (e.g. absorb) the p-polarized light beams, while the second polarizer 14 is adapted to allow the p-polarized light beams to pass through and filter (e.g. absorb) the s-polarized light beams. The reflective display panel 15 converts the s-polarized light beams into p-polarized light beams and reflects the p-polarized light beams back to the light guide plate 13, and the p-polarized light beams are output from the front-lit display 1 after sequentially passing through the light guide plate 13 and the second polarizer 14.

Figure 6:
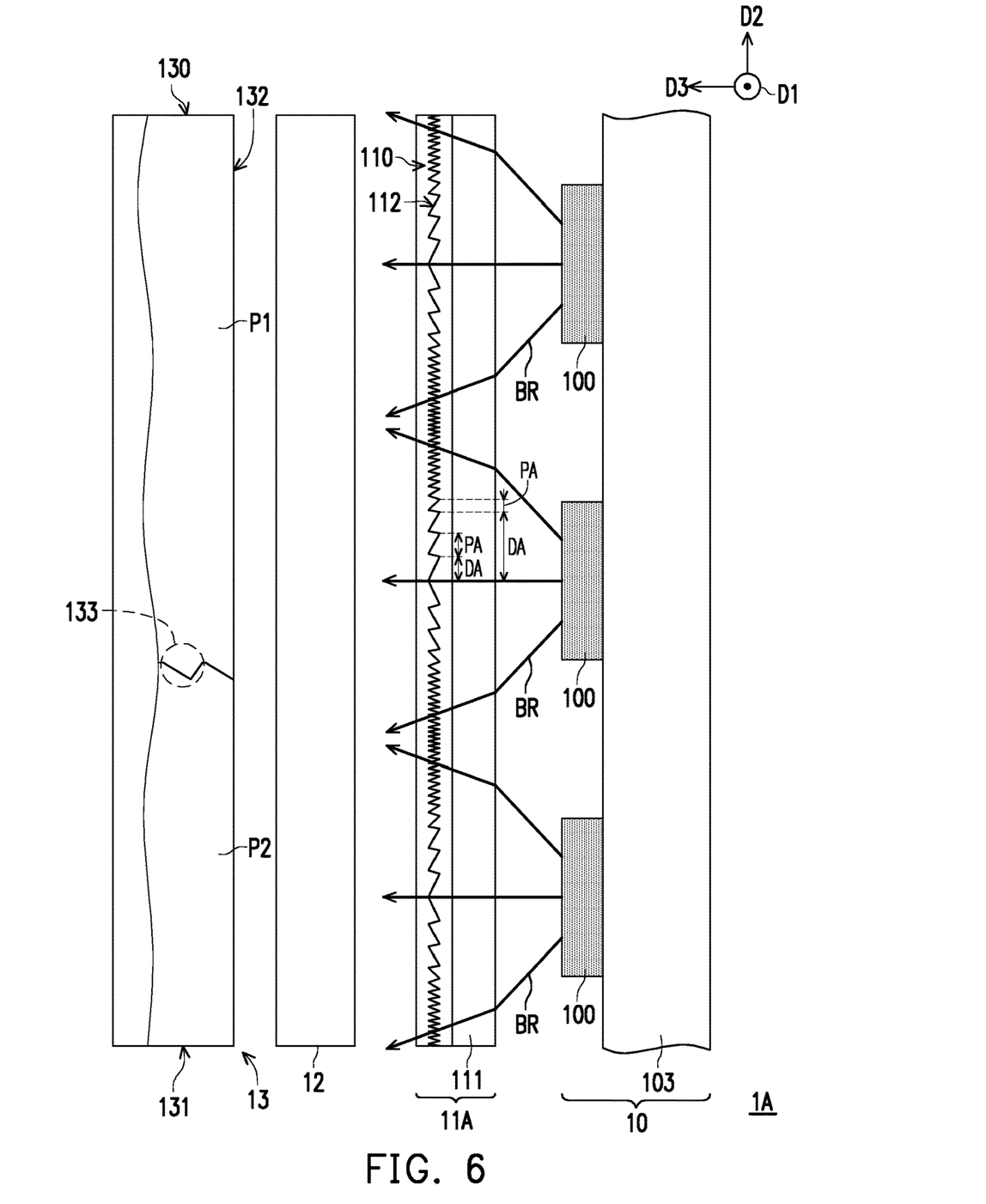
FIG. 6 is a partial schematic cross-sectional view of a front-lit display according to another embodiment of the invention.
Figure 7:
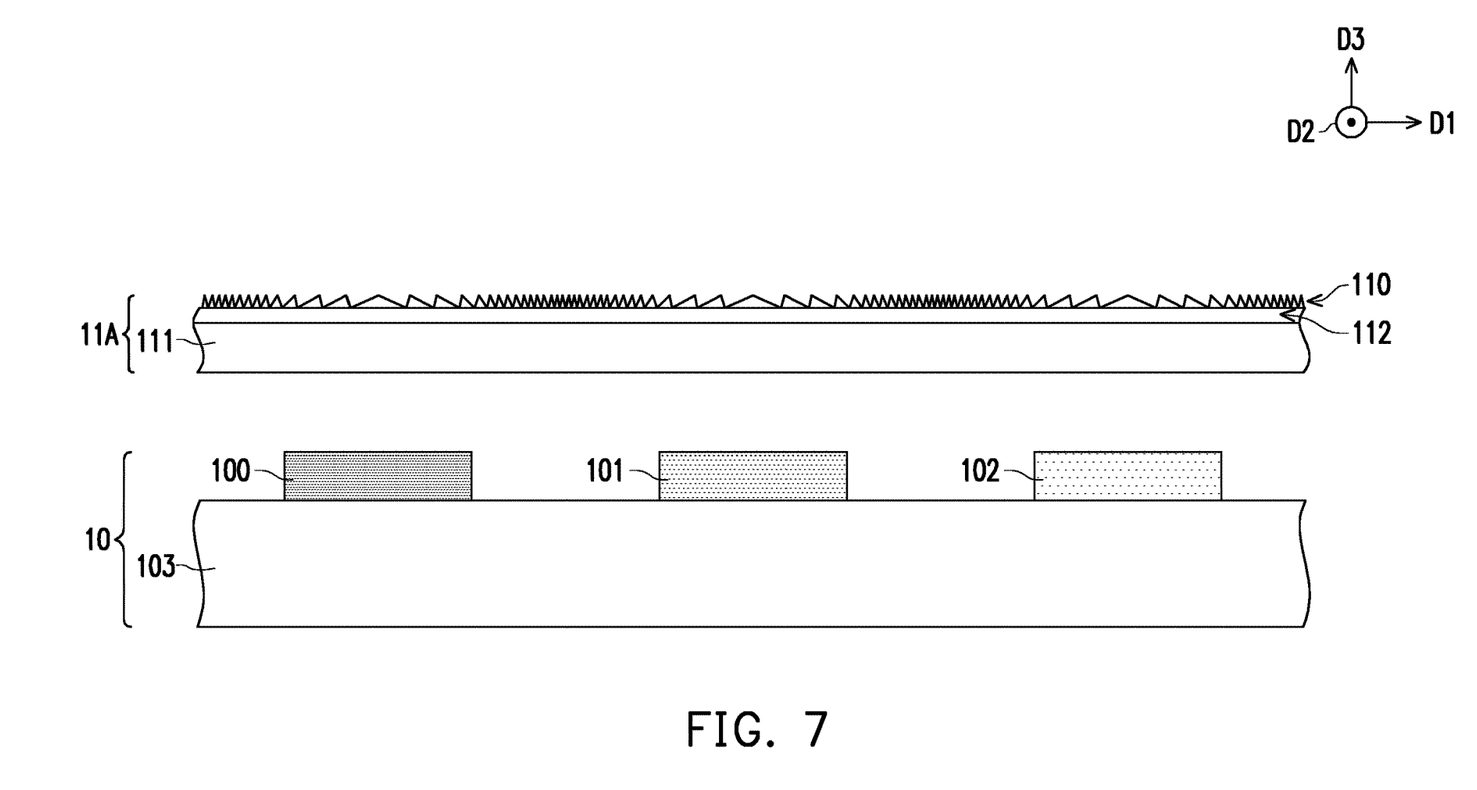
FIG. 7 is a partial schematic cross-sectional view of the light source and the coupling lens in FIG. 6.

FIG. 6 is a partial schematic cross-sectional view of a front-lit display 1A according to another embodiment of the invention. FIG. 7 is a partial schematic cross-sectional view of the light source 10 and the coupling lens 11A in FIG. 6. Referring to FIGS. 6 and 7, the main difference between the front-lit display 1A and the front-lit display 1 in FIG. 1 is that the coupling lens 11A of the front-lit display 1A is different from the coupling lens 11 of the front-lit display 1 in FIG. 1.

Specifically, the coupling lens 11A further includes a plurality of horizontal columnar structures 112 arranged along the second direction D2 and respectively extending along the first direction D1, and the horizontal columnar structures 112 are overlapped with the vertical columnar structures 110 along the third direction D3. For example, the horizontal columnar structures 112 and the vertical columnar structures 110 are formed on the transparent substrate 111 by sequentially curing optical glues having different refractive indices through heat or illumination of light. However, the relative setting relationship, the manufacturing sequence and manufacturing method of the horizontal columnar structures 112 and the vertical columnar structures 110 are not limited to those shown in FIGS. 6 and 7 and the description above. In other embodiments, the vertical columnar structures 110 may be formed before the horizontal columnar structures 112 are formed. Besides, the horizontal columnar structures 112 and the vertical columnar structures 110 may be formed respectively on two opposite surfaces of the transparent substrate 111. Alternatively, the horizontal columnar structures 112 and the vertical columnar structures 110 may be formed on two transparent substrates.

The horizontal columnar structures 112 are adapted to expand an illumination range of each color light beam (red light beams BR are exemplarily shown in FIG. 6) along the second direction D2 and allow more of the light beams to be transmitted to a side of the light guide plate 13 away from the side surface 132. For example, the horizontal columnar structures 112 may adopt a similar configuration of the vertical columnar structures 110 shown in FIG. 3; however, the arrangement direction and extension direction between the horizontal columnar structures 112 and the horizontal columnar structures 112 are opposite. In other embodiments, the horizontal columnar structures 112 may adopt a different configuration than the vertical columnar structures 110.

FIG. 6 schematically shows the number of light emitting elements (e.g. the light emitting elements 100) emitting light beams of the same color (e.g. red light beams BR) arranged in the second direction D2 is three, wherein each of the light emitting elements is disposed corresponding to plural (more than one) horizontal columnar structures 112 among the plurality of horizontal columnar structures 112, and pitches PA of the plural horizontal columnar structures 112 decrease as distances DA to the corresponding light emitting element along the second direction D2 increase. However, the number, arrangement, shapes and manufacturing method of the horizontal columnar structures 112 and the relative setting relationship between the light emitting elements and the horizontal columnar structures 112 are not limited to those shown in FIGS. 6 and 7 and the description above.

Figure 8:
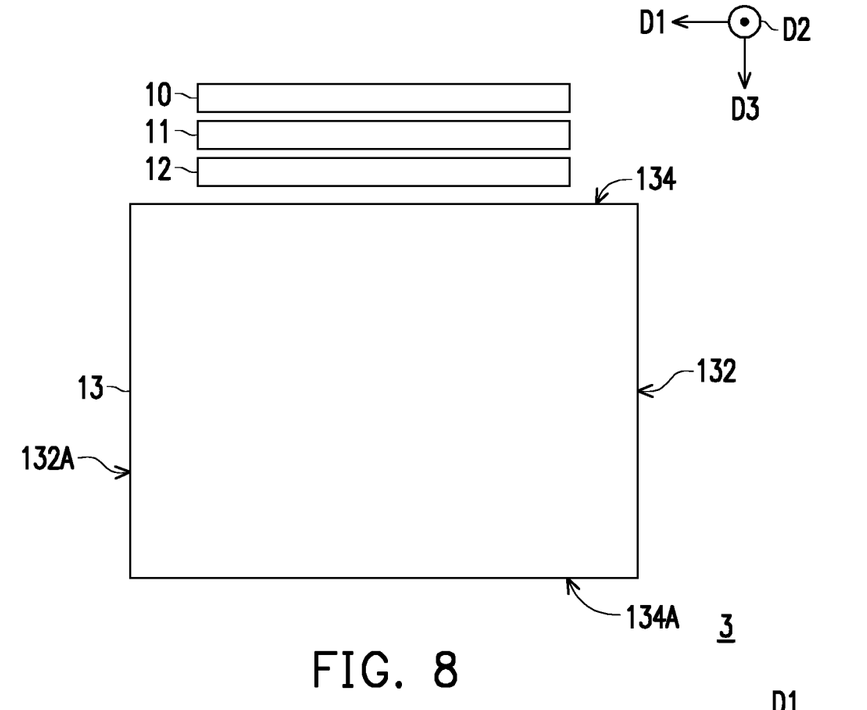
FIGS. 8 to 10 are respectively schematic top views of front-lit displays according to other embodiments of the invention.
Figure 9:
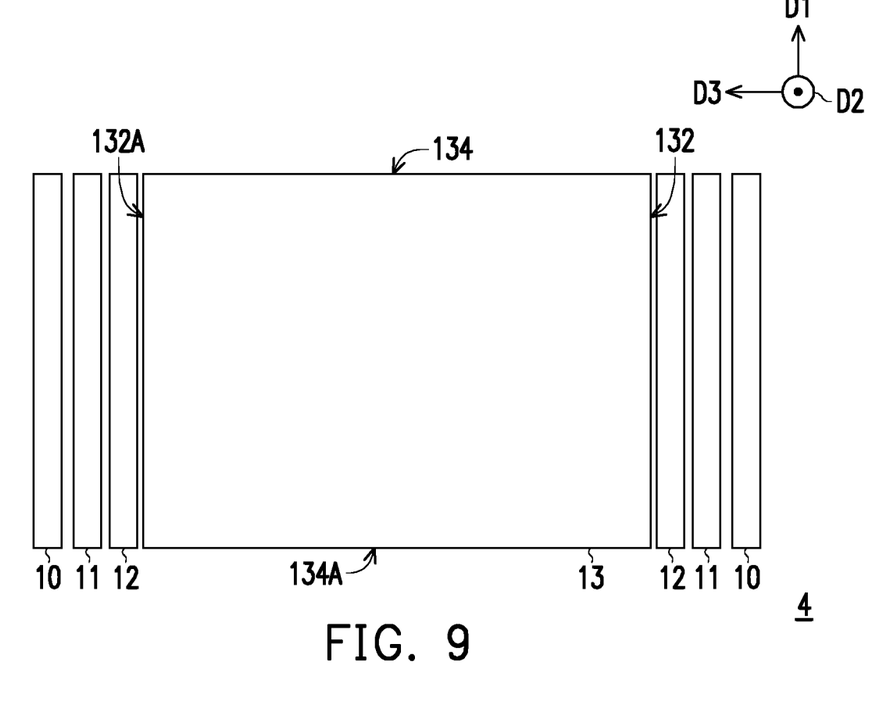
Figure 10:
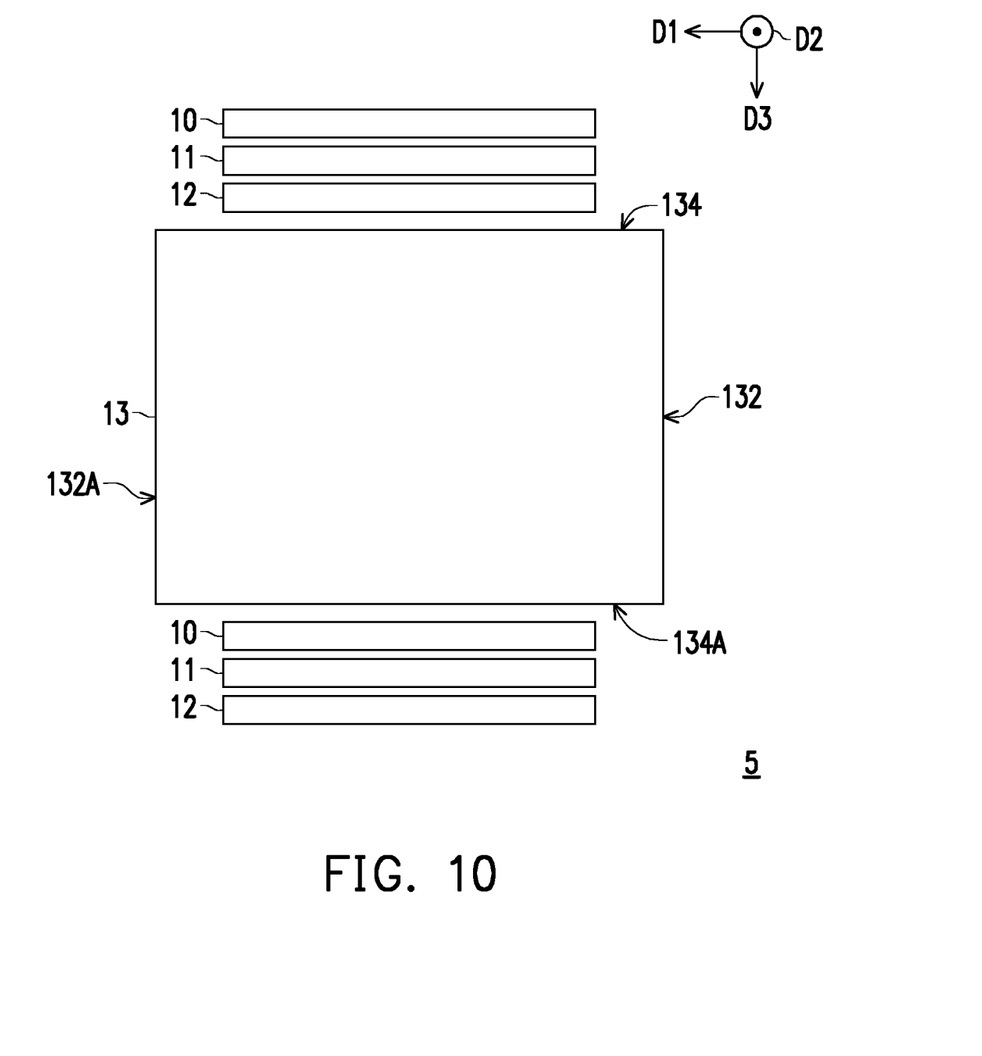

FIGS. 8 to 10 are respectively schematic top views of front-lit displays 3, 4 and 5 according to other embodiments of the invention. Referring to FIG. 8, the main difference between the front-lit display 3 and the front-lit display 1 in FIG. 5 is the relative setting relationship of the light source 10, the coupling lens 11, and the first polarizer 12 relative to the light guide plate 13. Specifically, the light guide plate 13 has two short side surfaces (side surfaces 132 and 132A) and two long side surfaces (side surfaces 134 and 134A), as shown in FIG. 8. In FIG. 5, the light source 10, the coupling lens 11, and the first polarizer 12 are disposed at one of the short side surfaces (e.g. side surface 132) of the light guide plate 13, while in FIG. 8, the light source 10, the coupling lens 11, and the first polarizer 12 are disposed at one of the long side surfaces (e.g. side surface 134) of the light guide plate 13.

Referring to FIG. 9, the main differences between the front-lit display 4 and the front-lit display 1 in FIG. 5 are as follows. The front-lit display 4 includes two light sources 10, two coupling lenses 11, and two first polarizers 12. Each of the two coupling lenses 11 is disposed corresponding to one of the two light sources 10, and each of the two first polarizers 12 is disposed corresponding to one of the two coupling lenses 11. The light guide plate 13 has a plurality of side surfaces 132, 132A, 134, and 134A, and the two light sources 10 are disposed corresponding to two opposite side surfaces (e.g. side surfaces 132 and 132A) among the plurality of side surfaces 132, 132A, 134, and 134A.

Referring to FIG. 10, the main differences between the front-lit display 5 and the front-lit display 4 in FIG. 9 are as follows. In FIG. 9, the two light sources 10, the two coupling lenses 11, and the two first polarizers 12 are disposed at the short side surfaces (side surfaces 132 and 132A) of the light guide plate 13, while in FIG. 10, the two light sources 10, the two coupling lenses 11, and the two first polarizers 12 are disposed at the long side surfaces (side surfaces 134 and 134A) of the light guide plate 13.

In conclusion, in the front-lit display according to the embodiment of the invention, since the light emitting elements that emit light beams of different colors are arranged along the first direction (the vertical direction) instead of the second direction (the horizontal direction), smaller etendue in the horizontal direction is obtained and the ray path control design is less difficult. Besides, the light uniformity in the horizontal direction is improved by placing the vertical columnar structures instead of a diffuser in front of the light emitting elements, thus the light uniformity is improved without increasing the etendue in the horizontal direction and the difficulty of ray path control design and without decreasing the light efficiency and contrast ratio. Therefore, the front-lit display according to the embodiment of the invention has good light uniformity, light efficiency, and contrast ratio. In one embodiment, the light uniformity in the vertical direction may be improved by further placing horizontal columnar structures in front of the light emitting elements. In another embodiment, the front-lit display may have two light sources, two coupling lenses, and two first polarizers disposed at opposite side surfaces of the light guide plate.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A front-lit display comprising:
a light source adapted to output light beams of different colors;
a coupling lens disposed on transmission paths of the light beams from the light source;
a first polarizer disposed on transmission paths of the light beams from the coupling lens;
a light guide plate disposed on transmission paths of the light beams from the first polarizer, the light guide plate having a first surface, a second surface opposite to the first surface, a side surface connecting the first surface and the second surface, and a plurality of light guiding microstructures located between the first surface and the second surface, wherein the light beams from the first polarizer enter the light guide plate through the side surface;
a second polarizer disposed on the first surface of the light guide plate; and
a reflective display panel disposed below the second surface of the light guide plate,
wherein the light source comprises a plurality of light emitting elements, the light emitting elements that emit light beams of different colors are arranged along a first direction instead of a second direction, the first direction is parallel to the side surface and the first surface, and the second direction is parallel to the side surface and perpendicular to the first surface, and
wherein the coupling lens comprises a plurality of vertical columnar structures arranged along the first direction and respectively extending along the second direction.

2. The front-lit display according to claim 1, wherein the plurality of light emitting elements are micro LEDs, and the light emitting elements that emit light beams of the same color are arranged along the second direction.

3. The front-lit display according to claim 1, wherein the plurality of light emitting elements are LEDs, the light emitting elements that output light beams of different colors are alternately arranged along the first direction, and the number of the light emitting elements arranged along the second direction is only one.

4. The front-lit display according to claim 1, wherein the plurality of vertical columnar structures comprises a plurality of columnar prisms.

5. The front-lit display according to claim 4, wherein each of the plurality of light emitting elements is disposed corresponding to plural vertical columnar structures among the plurality of vertical columnar structures, and pitches of the plural vertical columnar structures decrease as distances to the corresponding light emitting element along the first direction increase.

6. The front-lit display according to claim 4, wherein the plurality of columnar prisms comprises a plurality of non-isosceles columnar prisms.

7. The front-lit display according to claim 1, wherein the coupling lens further comprises a plurality of horizontal columnar structures arranged along the second direction and respectively extending along the first direction, and the plurality of horizontal columnar structures are overlapped with the plurality of vertical columnar structures along a third direction perpendicular to the first direction and the second direction.

8. The front-lit display according to claim 1, wherein the light guide plate comprises a first portion and a second portion, the first portion is located between the second portion and the second polarizer, the first portion and the second portion have a plurality of complementary columnar prisms at an interface therebetween, and the plurality of light guiding microstructures comprises the plurality of complementary columnar prisms.

9. The front-lit display according to claim 8, wherein the first portion and the second portion have the same refractive index.

10. The front-lit display according to claim 1, wherein the reflective display panel is a liquid crystal on silicon display, and the first polarizer and the second polarizer have opposite polarization directions.

11. The front-lit display according to claim 1, wherein the front-lit display comprises two light sources, two coupling lenses, and two first polarizers, each of the two coupling lenses is disposed corresponding to one of the two light sources, and each of the two first polarizers is disposed corresponding to one of the two coupling lenses, the light guide plate has a plurality of side surfaces, and the two light sources are disposed corresponding to two opposite side surfaces among the plurality of side surfaces.

12. The front-lit display according to claim 1, wherein the light beams of different colors are light beams of different wavelengths or light beams of different color temperatures.

* * * * *